United States Patent
Darde et al.

(10) Patent No.: US 9,550,671 B2
(45) Date of Patent: Jan. 24, 2017

(54) METHOD FOR PRODUCING HYDROGEN BY REFORMING HYDROCARBONS USING STEAM, COMBINED WITH CARBON DIOXIDE CAPTURE AND STEAM PRODUCTION

(71) Applicant: L'Air Liquide, Societe Anonyme pour l'Etude et l'Exploitation des Procedes Georges Claude, Paris (FR)

(72) Inventors: Arthur Darde, Paris (FR); Mathieu Leclerc, Paris (FR); Thomas Morel, Noisy le Grand (FR)

(73) Assignee: L'Air Liquide Société Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 0 days.

(21) Appl. No.: 14/651,115

(22) PCT Filed: Oct. 31, 2013

(86) PCT No.: PCT/FR2013/052611
§ 371 (c)(1),
(2) Date: Jun. 10, 2015

(87) PCT Pub. No.: WO2014/091097
PCT Pub. Date: Jun. 19, 2014

(65) Prior Publication Data
US 2015/0315020 A1    Nov. 5, 2015

(30) Foreign Application Priority Data
Dec. 13, 2012   (FR) ...................... 12 62001

(51) Int. Cl.
*C01B 3/48*    (2006.01)
*B01J 19/24*   (2006.01)
*C01B 3/56*    (2006.01)

(52) U.S. Cl.
CPC ............... *C01B 3/48* (2013.01); *B01J 19/245* (2013.01); *C01B 3/56* (2013.01);
(Continued)

(58) Field of Classification Search
CPC ............. C01J 19/245; C01B 3/48; C01B 3/56
See application file for complete search history.

(56) References Cited

U.S. PATENT DOCUMENTS

| 2008/0179569 A1* | 7/2008 | Clomburg .............. B01J 8/0285 252/373 |
| 2009/0230359 A1 | 9/2009 | Guvelioglu et al. |

(Continued)

FOREIGN PATENT DOCUMENTS

| FR | 2 961 802 | 12/2011 |
| WO | WO 2006/054008 | 5/2006 |
| WO | WO 2006/097703 | 9/2006 |

OTHER PUBLICATIONS

International Search Report and Written Opinion for PCT/FR2013/052611, mailed Jan. 20, 2014.

(Continued)

*Primary Examiner* — Paul Wartalowicz
(74) *Attorney, Agent, or Firm* — Justin K. Murray

(57) ABSTRACT

A method for producing hydrogen by reforming hydrocarbons using steam, combined with carbon dioxide capture and steam production, which involves mixing the hydrocarbons to be reformed with steam in order to produce the feedstock for the reforming, generating a syngas; the syngas is then cooled, and enriched with $H_2$ and $CO_2$; and then cooled. The condensates of the method are separated from the syngas in order to be used in the method, the saturated syngas being treated by adsorption with pressure modulation so as to produce hydrogen and a gaseous effluent containing $CO_2$ that is captured in a $CO_2$-purifying unit. The condensates from the cooling of the syngas at the outlet of the shift reactor are used in the method for producing highly pure steam supplying the mixing point and for exportation; the (Continued)

CPU also produces CPU condensates that are recycled to be treated jointly with the condensates of the method.

13 Claims, 1 Drawing Sheet

(52) U.S. Cl.
CPC ............... *B01J 2219/00103* (2013.01); *B01J 2219/00105* (2013.01); *B01J 2219/24* (2013.01); *C01B 2203/0233* (2013.01); *C01B 2203/0244* (2013.01); *C01B 2203/0283* (2013.01); *C01B 2203/042* (2013.01); *C01B 2203/043* (2013.01); *C01B 2203/046* (2013.01); *C01B 2203/0475* (2013.01); *C01B 2203/0883* (2013.01); *C01B 2203/0894* (2013.01); *C01B 2203/147* (2013.01); *Y02P 20/129* (2015.11); *Y02P 30/30* (2015.11)

(56) References Cited

U.S. PATENT DOCUMENTS

| | | |
|---|---|---|
| 2010/0104499 A1 | 4/2010 | Grover |
| 2011/0085967 A1 | 4/2011 | Raybold et al. |
| 2011/0146991 A1 | 6/2011 | Palamara et al. |

OTHER PUBLICATIONS

Search Report and Written Opinion for FR 1262001, mailed Jul. 16, 2013.

\* cited by examiner

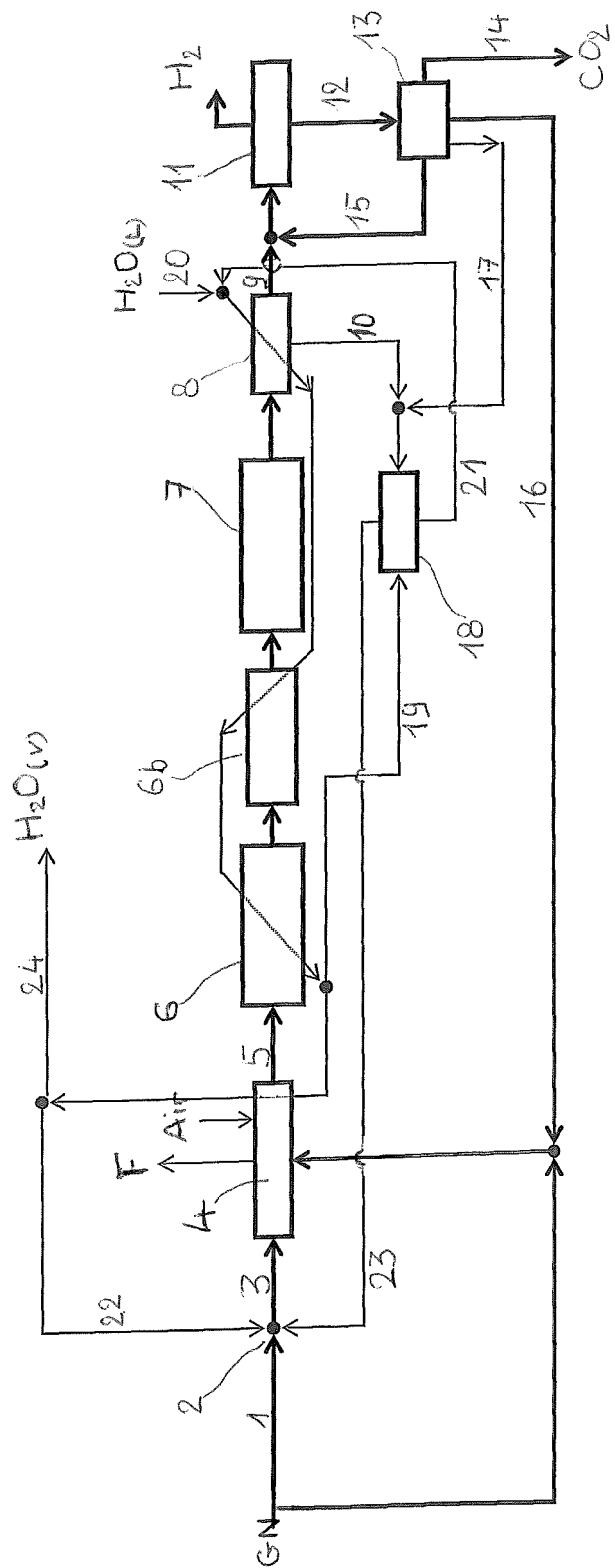

METHOD FOR PRODUCING HYDROGEN BY REFORMING HYDROCARBONS USING STEAM, COMBINED WITH CARBON DIOXIDE CAPTURE AND STEAM PRODUCTION

CROSS REFERENCE TO RELATED APPLICATIONS

This application is a §371 of International PCT Application PCT/FR2013/052611, filed Oct. 31, 2013, which claims the benefit of FR1262001, filed Dec. 13, 2012, both of which are herein incorporated by reference in their entireties.

TECHNICAL FIELD OF THE INVENTION

The present invention relates to hydrogen production with $CO_2$ capture.

SUMMARY OF THE INVENTION

In one embodiment, the invention relates to a process for producing hydrogen by reforming hydrocarbons using steam, combined with carbon dioxide capture and steam production, in particular steam reforming and also autothermal reforming, in which the hydrocarbons to be reformed are mixed with steam so as to produce the feedstock for the reforming, a synthesis gas is generated, comprising essentially hydrogen, carbon monoxide, carbon dioxide, and also excess steam, residual methane, water and impurities; the synthesis gas produced is cooled, enriched with $H_2$ and $CO_2$ by converting CO with steam (shift reaction); the enriched synthesis gas is cooled by indirect heat exchange with fluids from the process so as to produce a synthesis gas saturated with water and process condensates which are separated from the synthesis gas so as to be used in the process, the saturated synthesis gas being treated by pressure swing adsorption so as to produce hydrogen and an offgas containing $CO_2$ which is captured in a $CO_2$-purification unit.

The process condensates—i.e. the condensates resulting from the cooling of the synthesis gas at the outlet of the shift reactor—can be used in the process itself according to two modes.

The first mode of use employs a condensate stripper; the process condensates are treated by steam stripping in a column called a stripper, the steam loaded with impurities resulting therefrom being recycled with supplementary highly pure steam to the mixing point for the hydrocarbons with the steam, while the purified condensates are used to produce highly pure steam via the process waste heat boiler both in order to provide the supplementary steam for the mixing point and to provide pure export steam.

The second mode of use of the condensates does not call for steam stripping of the condensates; the process condensates are mixed with demineralized water as make-up, then are vaporized and then superheated in the waste heat boiler thus generating impure steam for feeding the mixing point with process steam;

according to a first variant, in which it is desired to produce highly pure export steam, said steam is treated in a circuit—distinct from the circuit for production of impure steam—where demineralized water is vaporized, then the vapor is heated, as appropriate superheated, by heat exchange with hot fluids from the process (or associated with the process). Part of it is sent as a steam supplement to the mixing point and part of it is exported;

according to a second variant, implemented in the case where the export steam may be impure steam, the process condensates are mixed with all the demineralized water, jointly vaporized in the waste heat boiler, the steam being heated, as appropriate superheated, by heat exchange with hot fluids from the process (or associated with the process); a part of the impure steam generated is sent to the mixing point, the excess steam is exported.

The term "highly pure steam" as used in the description and in the claims means steam containing less than 50 ppmv of oxygen, 50 ppmv of carbon dioxide, 50 ppmv of methanol, 50 ppmv of amines and 50 ppmv of ammonia.

The term "process condensates" as used in the description and in the claims means the condensates made up of the aqueous phase obtained from the synthesis gas, during final cooling thereof at the end of the conversion (shift) step, and recovered by separation.

Certain embodiments of the invention apply in the context of steam reforming processes, in particular processes for steam methane reforming (SMR) by means of a reforming catalyst, and also in the case of processes coupling steam reforming and partial oxidation of hydrocarbons (autothermal reforming, or ATR, process). In this case, the hydrocarbons are mixed with steam, and then they are partially oxidized in a burner, thus producing the heat required for the reforming reaction at the same time as a gas poor in hydrogen; this first gas produced is then steam-reformed so as to provide more hydrogen and carbon monoxide. In these two cases, the steam reforming is carried out by means of a reforming catalyst.

The above steam reforming processes are used to produce synthesis gases from hydrocarbon-based gas feedstocks, the main reaction being the steam methane reforming reaction; in the case of feedstocks comprising hydrocarbons containing at least two carbon atoms, the reforming is preceded by a pre-reforming, which is itself also with steam, the essential function of which is to convert the hydrocarbons containing at least two carbon atoms into carbon monoxide, hydrogen and methane. The obtaining of synthesis gas (also called syngas) generally represents a first step in a final production which may be a production of hydrogen, of CO or of a $H_2$/CO mixture. Depending on the feedstock to be reformed, on the desired final production and on the operating conditions applied to this effect, the synthesis gases can have different compositions, but are always in the form of a mixture containing mainly hydrogen ($H_2$) and carbon monoxide (CO) and in smaller proportions carbon dioxide ($CO_2$), but also unreacted methane ($CH_4$), excess steam and traces of various compounds, impurities initially present but also generated during the reforming, and essentially due to the presence of the catalyst.

For a final production of essentially hydrogen, the synthesis gas produced is then treated in at least one reactor where the CO conversion reaction takes place, termed "shift reactor", in which the carbon monoxide produced during the reforming is, under the action of steam present in the synthesis gas and in the presence of an appropriate catalyst, essentially converted into additional hydrogen and carbon dioxide.

An essential aspect of hydrogen production units is that they exhibit extensive energy integration allowing the use of the heat available in the hot fluids of the unit, in particular for producing steam, preheating reagents or preheating air.

Indeed, exiting the reformer at a very high temperature between 800 and 950° C., the synthesis gas must be cooled in order to be subsequently converted. It thus undergoes a first cooling to a temperature below 400° C., before being able to enter a shift reactor; the synthesis gas at the shift reactor outlet (or of the final shift reactor) again undergoes cooling to a temperature of between 20 and 60° C., suitable for the downstream treatment by adsorption and the steam present is partially condensed. The saturated synthesis gas is separated from the liquid phase resulting from the condensation which constitutes the "process condensates".

These process condensates, which contain essentially water, are recovered and reused to produce steam by means of the heat originating from the process. All or part of the steam thus produced, termed process steam, is mixed with the feedstock intended for producing the synthesis gas in the reformer. However, the process condensates also contain impurities dissolved in the water; some of these dissolved impurities were present in the streams feeding the reformer, others were produced during the reforming; they originate, however, predominantly from reactions in the shift reactor, and can be attributed to the presence of the catalyst. Among the impurities present in the process condensates, are thus carbon dioxide, methanol, aqueous ammonia and amines As indicated above, depending on the level of impurities in the process condensates and on the quality specifications that the steam intended for exportation must adhere to, several modes of use of these impure process condensates are possible.

Certain embodiments of the invention relate more particularly to the processes according to which the process condensates are treated by steam stripping.

The steam stripping of the process condensates makes it possible to produce purified process condensates and steam loaded with impurities (which is also called impure steam). The stripping consists in fact in causing the entrainment of gas or of volatile materials dissolved in water, by means of a gas stream; when this gas is steam, this is therefore steam stripping.

In order to perform this stripping, highly pure steam generally originating from a waste heat boiler is used; this generally involves the waste heat boiler which uses the heat from the synthesis gas at the outlet of the reformer, and thus participates in the first cooling thereof.

Usually saturated, the highly pure steam used for the stripping is at a pressure of between 15 and 70 bar(a), more particularly between 30 and 55 bar(a). The steam is injected at the bottom of the stripper, whereas the condensates are injected into the top part of the stripper; the steam thus circulates in the opposite direction to the liquid stream of the condensates to be purified. In this way, the strippable impurities—i.e. the impurities that can be entrained in the steam—are in the steam at the top of the stripper. The steam thus loaded with impurities is entirely sent upstream of the reformer, to a point where it is mixed with the feedstock to be reformed. The impurities may thus be subsequently reformed with the natural gas in the reformer.

Additional highly pure steam originating from the waste heat boiler located downstream of the reforming zone is also injected at the mixing point so as to obtain the ratio of steam flow rate to hydrocarbon flow rate required for the operation and the optimization of the unit.

A second aspect—itself also essential in certain embodiments—relating to the hydrogen production facilities concerns the capture of the $CO_2$ produced by these facilities. Indeed, while, during the previous decades, the carbon dioxide was simply separated from the hydrogen and generally sent into the atmosphere, the demonstration of global warming and of the role that it plays therein has led to ensuring that the $CO_2$ jointly produced with the hydrogen is captured.

An industrial-scale hydrogen production facility represents an important source of $CO_2$ emission, and improving both the design and the operation thereof for the purpose of reducing $CO_2$ emissions of human origin in the atmosphere has thus become essential for hydrogen producers. Consequently, processes and technologies have been developed for capturing carbon dioxide in order both to reduce $CO_2$ emissions and to improve hydrogen production facilities, in terms of cost and of performance.

The carbon dioxide emissions of hydrogen production facilities can be reduced using several different separation techniques in order to extract the $CO_2$ contained in the flue gases, the syngas or the residual gases resulting from the process. The $CO_2$ thus captured can subsequently be compressed, transported and sequestered in underground storage reservoirs, used for enhanced oil recovery or for industrial or consumption purposes.

The techniques developed for carbon dioxide capture use essentially cryogenic, membrane, or physical and/or chemical adsorption or absorption processes; the choice of the technology depends in particular on the composition of the gas subjected to the capture, but also on the costs of the electricity and the steam, on the investments costs and on the (carbon) taxes applied.

Hydrogen is widely used industrially and in particular by the oil and refining industry for various processes. During steam reforming, the hydrocarbon feedstock is a gaseous feedstock, generally natural gas or a mixture of light hydrocarbons, the main constituent of which is methane. In the remainder of the description, in the interests of simplicity, the example of natural gas (GN) will be mentioned. The feedstock generally undergoes a pretreatment intended to remove the sulphides present so as to not poison the catalysts that will be used during the reforming The strongly endothermic reforming reaction takes place at high temperature and at high pressure (800 to 950° C. and 13.5 to 55 bar(a)). The heat required for the methane reforming reaction is supplied:

in the case of reforming of steam methane reforming (SMR) type, by the combustion of combustible gas—feed natural gas and residual gas from the process (generally derived from a PSA residual gas) essentially—with air in the combustion zone thus producing flue gases at very high temperature;
  in the case of autothermal reforming (ATR) by partial oxidation of the feedstock—in this case, the PSA residual gas is conventionally burnt to produce steam in a dedicated boiler.

The syngas resulting from the reforming is itself also very hot, and a part of the available heat is used to heat waste heat boiler water in order to produce steam.

The syngas cooled a first time can be sent to a reactor so as to produce additional hydrogen from the conversion, in the presence of water, of the CO to $CO_2$. This reactor is termed a "shift reactor" (also known as WGS reactor, WGS being the abbreviation for water gas shift). Following this step of the process, the $CO_2$ content of the syngas downstream of the WGS reactor increases, together with its $H_2$ content.

The syngas enriched with $H_2$ and $CO_2$ (and depleted of CO) is usually treated by pressure swing adsorption in an $H_2$ PSA unit so as to produce a gaseous stream of substantially pure hydrogen.

At the same time as almost pure hydrogen, the $H_2$ PSA unit produces a PSA offgas which contains the $CO_2$ contained in the synthesis gas feeding the PSA unit, and also the methane which did not react during the reforming, CO which did not react during the conversion step and a part of the hydrogen feeding the PSA unit. Because of the presence of gases with high calorific values (methane, carbon monoxide and hydrogen), the PSA offgas is usually sent as fuel to the burners of the SMR or of the dedicated boiler in the case of an ATR.

The PSA offgas is the gaseous stream richest in $CO_2$ of the process described above (typically 40-55% in the absence of capture upstream); the offgas is available at a pressure below 2 bar(a). By virtue of this relatively high $CO_2$ content, the cryogenic $CO_2$ capture solution may be applied to the PSA offgas.

Cryogenic $CO_2$ capture (CPU) calls for the partial condensation and/or the distillation of the $CO_2$ contained in the $CO_2$-rich gaseous stream in a cryogenic purification unit (CPU). It should be noted that, since the partial condensation is carried out under pressure, the literature also makes reference to the purification/compression duality as a replacement for the purification/cryogenics duality for the same abbreviation CPU, and the same operation. The gas, after drying and compression to a pressure between 20 and 100 bar(a), is cooled to a temperature close to that of the triple point of $CO_2$ (approximately $-56°$ C.). Under these temperature and pressure conditions, it will partially condense, the liquid phase being particularly enriched with $CO_2$ and the gas phase with non-condensable gases. The liquid obtained can then be distilled so as to achieve $CO_2$ purities greater than 99%.

A process of $CO_2$ capture by CPU—applied to the PSA offgas—operates according to the following scheme: the gaseous stream of offgas is compressed and dried such that its pressure is between approximately 20 and 100 bar(a), then it undergoes one or more successive condensation/separation steps in the CPU unit so as to produce a liquid stream enriched with $CO_2$ and a gas stream (capture offgas) enriched with hydrogen and with other constituents lighter than $CO_2$ and therefore non-condensable under the operating conditions, in particular $CH_4$, $H_2$ and CO. The condensation/separation steps can be supplemented by membrane separation steps.

During the compression step preceding the drying step, the water contained in the offgas will partially condense with a part of the water-soluble impurities contained in the gas. The pressure during the drying step is between 1 and 50 bar(a), the pressure of the condensates formed is consequently between approximately 1 and 50 bar(a). Formed in the CPU unit, they are denoted "CPU condensates" in the description and in the claims. The CPU condensates are separated prior to the separation/condensation of the $CO_2$ and are discharged as waste water to a treatment plant which may be a waste water treatment plant of the industrial site where the CPU is installed, but will more commonly be a dedicated treatment plant; in the absence of waste water treatment plant available for treating these additional condensates, or if the plant already present is not capable of treating the CPU condensates owing to their composition—in particular, the presence of methanol in the CPU condensates is very bothersome, since it is a powerful bactericide which limits or even makes impossible a treatment by bacterial degradation commonly used for waste water treatment. A facility for treatment of condensates of this type is relatively expensive since it is difficult to implement, more particularly owing to the presence of methanol in the condensates.

It is therefore desirable to use a technique for treating these condensates which is more economical and especially less sensitive to methanol content. The solution according to the invention consists in integrating the treatment of the condensates coming from the CPU into the hydrogen production process; more specifically, it will involve, according to the invention, combining the treatment of the CPU condensates with that of the process condensates resulting from the cooling of the synthesis gas as described above.

This solution, integrated into the process, also has the advantageous adaptations and variants according to the situations; it is thus that:

the total number of pieces of condensate treatment equipment is not increased—no equipment for treatment of the CPU condensates before discharge—the investments costs are therefore reduced, as is the ground occupancy of the facility;

since the condensates of the CPU are recycled to the reforming zone, the make-up of demineralized water required by the hydrogen production unit is decreased accordingly;

the compounds present in the condensates and which can be incorporated into the feedstock are sent with the steam to the reforming They are then eliminated and participate in the hydrogen production.

For this, the main subject of the invention is a process for producing hydrogen by reforming hydrocarbons using steam, combined with carbon dioxide capture and highly pure steam production, comprising at least the steps of a) mixing the hydrocarbons to be reformed with steam so as to produce the feedstock for the reforming, b) generating, by reforming, a synthesis gas comprising essentially hydrogen, carbon monoxide and also excess steam, carbon dioxide, residual methane, water and impurities from the mixture resulting from step a), c) first cooling of the synthesis gas, d) generating a synthesis gas enriched with $H_2$ and $CO_2$ by steam conversion of the CO contained in the cooled synthesis gas resulting from step c), e) cooling the synthesis gas enriched with $H_2$ and $CO_2$ resulting from step d) by indirect heat exchange to a temperature of about ambient temperature, at least below 60° C. and preferably below or equal to 40° C., so as to produce a saturated synthesis gas and condensates C1, f) separating the condensates C1 from the saturated synthesis gas resulting from e), g) treating the synthesis gas resulting directly or indirectly from step f) in a unit for hydrogen purification by pressure swing adsorption, so as to produce a stream of hydrogen having a purity of at least 99% and a stream of offgas containing at least 40% of $CO_2$, h) treating the stream of PSA offgas resulting from step g) in a CPU unit producing at least one stream of purified $CO_2$ and at least one stream of non-condensables, and also steps of treating all or part of the condensates C1 resulting from the process comprising at least the steps of:

k1) pumping the condensates C1 at a pressure of between 15 and 90 bar(a), preferably between 25 and 70 bar(a), k2) heating the condensates C1 under pressure at a temperature of between 150 and 290° C., preferably between 200 and 280° C., k3) steam-stripping the compressed and heated condensates C1—in a stripper—using highly pure steam so as to produce a stream of impure steam at the top of the column and a stream of purified condensates at the bottom of the column, k4) recycling the impure steam to step a) so as to be mixed with the hydrocarbons to be reformed, k5) recycling the purified condensates into the demineralized water feeding the associated highly pure steam production, and also steps of producing highly pure steam intended for export, comprising at least the steps of:

v1) feeding a highly pure steam circuit associated with the process with demineralized water, v2) preheating the pure water circulating in the circuit by indirect heat exchange with at least one fluid from the process, v3) vaporizing the preheated pure water against the synthesis gas originating from the reforming in a waste heat boiler, v4) using a part of the highly pure steam for step k3 of stripping the process condensates, v5) recycling a part of the highly pure steam to step a) so as to be mixed with the hydrocarbons to be reformed, v6) making highly pure steam available for export, characterized in that the treatment step h) also produces at least one stream of condensates C2, and the condensates C2 are recovered and recycled into the process upstream of step k3) of steam stripping, so as to be treated together with the condensates C1.

In this way, the residual impurities present in the condensates C2 of the CPU are entrained in the steam at the same time as those of the process condensates C1, and are recovered as reforming feedstock while at the same time recovering the condensates that have been purified in the stripper for the generation of pure steam.

In accordance with other advantageous characteristics of the invention, the latter may exhibit one or more of the variants which are described hereinafter.

According to their pressure and their temperature, the condensates C2 from the CPU are added to the process condensates upstream of the stripper, in various locations, after having undergone, if required, heating and/or pumping steps, via the means for pumping or heating the process condensates C1 or via dedicated means. Indeed, the condensates C1 are at the pressure of the synthesis gas, whereas the pressure of the condensates C2 depends on the pressure of the gas treated by the CPU. Thus, advantageously:

the condensates C2 can be mixed with the condensates C1 before the pumping of the condensates C1; this variant is preferably used when the condensates C2 originating from the CPU unit are at a pressure above or equal to that of the condensates C1 before the pumping of said condensates, but below the operating pressure of the stripper and the pump for the condensates C1 and the exchanger for preheating of the stripper are able to treat the additional flow of condensates C2;

alternatively, the condensates C2 can be pumped and then mixed with the condensates C1 before the pumping of the condensates C1; this variant is preferentially used when the condensates C2 originating from the CPU unit are at a pressure below that of the condensates C1 before pumping of said condensates and the pump for the condensates C1 and the exchanger for preheating of the stripper are able to treat the additional flow of condensates C2;

alternatively, the condensates C2 are mixed with the condensate C1 after the pumping but before the preheating of the condensate C1; this variant is favored when the condensates C2 originating from the CPU unit are at a pressure above or equal to that of the condensate C1 after the pumping of said condensates and the exchanger for preheating of the stripper is able to treat the additional flow of condensates C2;

according to another variant, the condensates C2 are pumped and then mixed with the condensate C1 after the pumping but before the preheating of the condensate C1, this solution is preferentially used when the condensates C2 originating from the CPU unit are at a pressure below that of the condensates C1 before the pumping of said condensates and the exchanger for preheating of the stripper is able to treat the additional flow of condensates C2;

alternatively, the condensates C2 are mixed with the condensate C1 after the pumping and the preheating of the condensate C1, this variant is preferentially used when the condensates C2 originating from the CPU unit are at a pressure above or equal to that of the condensate C1 after the pumping and the preheating of said condensates, and the temperature of the condensates C2 is compatible with correct operation of the stripper;

according to another variant, the condensates C2 are pumped and then mixed with the condensate C1 after the pumping and the preheating of the condensate C1, this variant is advantageous, in particular when the condensates C2 originating from the CPU unit are at a pressure below that of the condensate C1 after the pumping and the preheating of said condensates, and the temperature of the condensates C2 is compatible with correct operation of the stripper;

alternatively, the condensates C2 are preheated and then mixed with the condensate C1 after the pumping and the preheating of the condensate C1, this variant is preferentially used when the condensates C2 originating from the CPU unit are at a pressure above or equal to that of the condensate C1 after the pumping and the preheating of said condensates, but the temperature of the condensates C2 is too low to ensure correct operation of the stripper;

according to another variant, the condensates C2 are pumped then preheated and finally mixed with the condensate C1 after the pumping and the preheating of the condensate C1, this variant can be advantageously used when the condensates C2 originating from the CPU unit are at a pressure below that of the condensate C1 after the pumping and the preheating of said condensates and the temperature of the condensates C2 is too low to ensure correct operation of the stripper.

In order to improve the performance levels of the stripping, and when the stripper is suitable, one of the following variants may advantageously be adopted:

the condensates C1 and C2 are introduced separately into the stripper, the introduction of the stream of impurest condensates being carried out above that of the stream of purer condensates; this solution is suitable in particular when the condensates C2 originating from the CPU unit are at a pressure above or equal to that of the stripper and the temperature of the condensates C2 is compatible with correct operation of the stripper;

the condensates C2 are preheated in a dedicated preheater before introduction into the stripper; this solution is suitable in particular when the condensates C2 originating from the CPU unit are at a pressure above or equal to that of the stripper but the temperature of the condensates C2 is too low to ensure correct operation of the stripper;

the condensates C2 are pumped before introduction into the stripper; this solution is suitable in particular when the condensates C2 originating from the CPU unit are at a pressure below that of the stripper. This solution may be preceded, as required, by a dedicated preheating step.

According to one advantageous variant of the process, when a column for washing with water—operating at a pressure of between 1 and 100 bar(a)—is used to wash the PSA offgas stream, it will be possible to recover the impurity-loaded liquid at the bottom of this column and to recycle it, with the condensates C2 of the CPU, into the steam stripping process. This step of washing the PSA offgas with water is added in particular when a large reduction in methanol and in ammonia is desirable in the CPU.

According to another aspect of this invention, the latter relates to a facility for producing hydrogen by reforming hydrocarbons using steam, combined with carbon dioxide capture and highly pure steam production, comprising at least:

(i) a means for mixing the hydrocarbons to be reformed with steam so as to produce the feedstock for the reforming, (ii) a reformer for the producing of a synthesis gas comprising essentially hydrogen, carbon monoxide and also excess steam, carbon dioxide, residual methane, water and impurities from the mixture resulting from step a), (iii) at least one heat exchanger for cooling the synthesis gas, (iv) at least one shift reactor for steam conversion of the CO contained in the cooled synthesis gas resulting from the exchanger (iii), (v) at least one heat exchanger for cooling the synthesis gas enriched with $H_2$ and $CO_2$ produced by the shift reactor (iv) by indirect heat exchange to a temperature of about ambient temperature, at least below or equal to 60° C., preferably below or equal to 40° C., so as to produce a saturated synthesis gas and condensate C1, (vi) a separator for separating the condensates C1 from the saturated synthesis gas resulting from the exchanger (v), (vii) a unit for hydrogen purification by pressure swing adsorption for treating the synthesis gas resulting directly or indirectly from step (vi) and producing a stream of hydrogen having a purity of at least 99% and a stream of offgas containing at least 40% of $CO_2$, (viii) a CPU unit for treating the PSA offgas stream produced by the PSA unit (vii) and producing at least one stream of purified $CO_2$ and at least one stream of non-condensables, and also means for treating all or part of the condensates C1 from the separator (vi) and comprising at least (ix) a pump for pumping the condensates C1 at a pressure of between 15 and 90 bar(a), preferably between 30 and 70 bar(a), (x) at least one heat exchanger for heating the condensates C1 under pressure at a temperature of between 150 and 290° C., preferably between 200 and 280° C., (xi) a stripper for steam stripping of the compressed and heated condensates C1 using highly pure steam so as to produce a stream of impure steam at the top of the column and a stream of purified condensates at the bottom of the column, (xii) means for recycling the impure steam and mixing it with the hydrocarbons to be reformed, (xiii) means for recycling the purified condensates into the demineralized water feeding the associated highly pure steam production, and also means for producing highly pure steam intended for export, comprising a highly pure steam production circuit, and also at least:

(xiv) a means for feeding the circuit of highly pure steam with demineralized water, (xv) at least one heat exchanger for preheating the pure water circulating in the circuit by indirect heat exchange with at least one fluid from the process, (xvi) a waste heat boiler for recovering heat against the synthesis gas originating from the reforming for the vaporization of the preheated pure water, (xvii) means for sending a part of the highly pure steam for the treatment of the process condensates, (xviii) means for recycling a part of the highly pure steam and mixing it with the hydrocarbons to be reformed, (xix) means for making highly pure steam available for export, characterized in that, since the CPU unit also produces at least one stream of condensates C2, the facility comprises means for recovering and recycling the condensates C2 upstream of the stripper so as to be treated together with condensate C1.

According to an advantageous variant, the facility comprises a pump for pumping the condensates C2, heating means for preheating the condensates C2, and means for introducing the stream of compressed and heated condensates C2 into the stream of compressed and heated condensate C1.

Other characteristics and advantages of the invention will emerge on reading the description which follows. One embodiment of the invention is represented therein in the single FIGURE, and described hereinafter by way of non-limiting example.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

The FIGURE shows an embodiment of the present invention.

DETAILED DESCRIPTION

The single FIGURE thus illustrates a process in which a stream 1 of natural gas (GN) is sent to the mixing point 2 so as to be mixed there with two streams of steam 22 and 23 produced in the process. The mode of production of these two streams of steam will be described subsequently. The stream 3 resulting from the mixing constitutes the feedstock feeding a steam methane reforming (SMR) module 4, the gas produced 5 is a synthesis gas comprising essentially hydrogen $H_2$ and CO, but also $CO_2$, $CH_4$, water and impurities; the gas 5 is cooled by heat exchange with water, first in the waste heat boiler 6, where the water is vaporized and then via a heat exchanger 6b, then feeds the conversion module 7, thus producing a synthesis gas enriched with $H_2$ and $CO_2$ and depleted of CO compared with the gas 5 produced by reforming, and also containing additional impurities generated during the conversion—thus containing about 65% to 85% of $H_2$, 11% to 22% of $CO_2$, 0.5% to 6% of unconverted CO and 3% to 10% of $CH_4$.

The synthesis gas is then cooled in 8 by heat exchange against water, in particular against demineralized water 20, to a temperature below or equal to 60° C., more generally below or equal to 40° C., allowing partial condensation of the water present in the synthesis gas and also of certain condensable impurities. The saturated synthesis gas 9 is separated from the liquid fraction 10 consisting of the impure process condensate C1 (i.e. loaded with impurities entrained with the water).

The synthesis gas 9 is then sent at 11 to the $H_2$ PSA unit which produces at least one gaseous stream of highly pure (greater than 99%) hydrogen, and also a residual gas 12 which for its part contains all the carbon dioxide, the vast majority of the unconverted methane and of the unconverted carbon monoxide, a large part of the nitrogen and hydrogen the quality of which depends on the yield from the $H_2$ PSA.

The residual gas 12 is sent at 13 to a CPU unit for separation of the $CO_2$, the CPU unit producing at least one stream 14 enriched with $CO_2$, a gaseous stream 15 rich in hydrogen $H_2$ which is recycled so as to feed the $H_2$ PSA in order to recover the hydrogen contained and to thus improve the overall hydrogen yield of the facility, a stream 16 of non-condensables comprising methane, hydrogen, carbon monoxide, non-condensed carbon dioxide, nitrogen and water, constituting the CPU offgas which is recycled as reforming fuel to the reforming module 4, and a liquid stream 17 made up of the CPU condensates C2; produced in the CPU unit, at least partly at the compression/drying stage which precedes the first $CO_2$ condensation step, these CPU condensates (condensates C2) contain predominantly water and also dissolved impurities, for instance methanol, aqueous ammonia and amines. By application of the process of the invention, the condensates C2 are recycled so as to be treated with the liquid stream 10 of the process condensates C1.

The process condensate C1 form the stream 10; augmented with the CPU condensates C2—which form the stream 17—they are subjected, in the stripper 18, to steam stripping countercurrently to a stream of highly pure steam 19 taken from highly pure steam circulating in an associated highly pure steam production circuit; the stream 22 of steam feeding the mixing point 2 is also taken from the associated highly pure steam production circuit.

The associated highly pure steam production circuit operates in the following way. The water—steam or liquid—circulates at a pressure between 20 and 60 bar(a). An external demineralized water supply 20 is provided, to which are added the purified condensates 21 recovered at the outlet of the stripper 18; the resulting stream of pure water is heated by heat exchange with the syngas in the heat exchangers 8 and 6b, and vaporized in the waste heat boiler 6. The saturated highly pure steam leaving the boiler is then separated into two parts; the first part constitutes the stream of highly pure steam 19 which is sent to the stripper, the second part of the saturated highly pure steam leaving the boiler 6 passes through the convection zone of the reformer where it recovers additional heat from the flue gases; it is again separated into two parts, one of them constitutes the superheated highly pure export steam 24, the second forms the stream of steam 22 sent to the mixing point 2. The stream 23 of steam feeding the mixing point 2 is for its part made up of the impure steam recovered at the top of the stripper 18 which contains the impurities, entrained in the steam, originating from the process condensate C1 and the CPU condensates C2.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A process for producing hydrogen by reforming hydrocarbons using steam, combined with carbon dioxide capture and highly pure steam production, the process comprising the steps of:
   a) mixing the hydrocarbons to be reformed with steam so as to produce a feedstock for reforming;
   b) reforming the feedstock under conditions effective to produce a synthesis gas comprising hydrogen, carbon monoxide and also excess steam, carbon dioxide, residual methane, water and impurities from the feedstock;
   c) cooling the synthesis gas;
   d) generating a synthesis gas enriched with $H_2$ and $CO_2$ by steam conversion of the CO contained in the cooled synthesis gas resulting from step c);
   e) cooling the synthesis gas enriched with $H_2$ and $CO_2$ resulting from step d) by indirect heat exchange with demineralized water to a temperature of about ambient temperature, so as to produce a saturated synthesis gas and first condensates;
   f) separating the first condensates from the saturated synthesis gas resulting from step e),
   g) treating the synthesis gas resulting directly or indirectly from step f) in a unit for hydrogen purification by pressure swing adsorption, so as to produce a stream of hydrogen having a purity of at least 99% and a stream of offgas containing at least 40% of $CO_2$;

h) treating the stream of PSA offgas resulting from step g) in a cryogenic purification unit (CPU) producing at least one stream of purified $CO_2$ and at least one stream of non-condensables; and i) treating all or part of the first condensates resulting from the process, wherein step i) further comprises the steps of:
  k1) pumping the first condensates at a pressure between 15 and 90 bar(a);
  k2) heating the first condensates under pressure at a temperature between 150 and 290° C.;
  k3) steam stripping of the compressed and heated first condensates—in a stripper—using a first portion of a highly pure steam so as to produce an impure steam stream at the top of the column and a stream of purified condensates at the bottom of the column;
  k4) recycling the impure steam to step a) so as to be mixed with the hydrocarbons to be reformed;
  k5) recycling the purified condensates into the demineralized water in step e);

j) producing highly pure steam intended for export, wherein step j) further comprises the steps of:
  v1) feeding a highly pure steam circuit with the demineralized water;
  v2) preheating the demineralized water circulating in the circuit by indirect heat exchange with at least one fluid from the process to form a preheated pure water;
  v3) vaporizing the preheated pure water against the synthesis gas originating from the reforming in a waste heat boiler to form the highly pure steam;
  v4) using the first portion of the highly pure steam for step k3);
  v5) recycling a second portion of the highly pure steam to step a) so as to be mixed with the hydrocarbons to be reformed;
  v6) making a third portion of the highly pure steam available for export, wherein the treatment step h) also produces at least one stream of second condensates, and are recovered and recycled into the process upstream of step k3) of steam stripping, so as to be treated together with the first condensates.

2. The process as claimed in claim 1, wherein the first condensates and the second condensates are introduced separately into the stripper, the introduction of the stream of the most impure condensates being carried out above that of the stream of the purer condensates.

3. The process as claimed in claim 2, wherein the second condensates are preheated in a dedicated preheater before introduction into the stripper.

4. The process as claimed in claim 2, wherein the second condensates are pumped before introduction into the stripper.

5. The process as claimed in claim 1, wherein the second condensates are mixed with the first condensates before the pumping of the first condensates.

6. The process as claimed in claim 1, wherein the second condensates are pumped and then mixed with the first condensates before the pumping of the first condensates.

7. The process as claimed in claim 1, wherein the second condensates are mixed with the first condensates after the pumping but before the preheating of the first condensates.

8. The process as claimed in claim 1, wherein the second condensates are pumped and then mixed with the first condensates after the pumping but before the preheating of the first condensates.

9. The process as claimed in claim 1, wherein the second condensates are mixed with the first condensates after the pumping and the preheating of the first condensates.

10. The process as claimed in claim 1, wherein the second condensates are pumped and then mixed with the first condensates after the pumping and the preheating of the first condensates.

11. The process as claimed in claim 1, wherein the second condensates are preheated and then mixed with the first condensates after the pumping and the preheating of the first condensates.

12. The process as claimed in claim 1, wherein the second condensates are pumped then preheated and finally mixed with the first condensates after the pumping and the preheating of the first condensates.

13. The process as claimed in claim 1, wherein step h) further produces a liquid stream comprising CPU condensates, wherein the process further comprises the steps of: withdrawing the liquid stream from the CPU; and recycling the liquid stream comprising CPU condensates into the process upstream of step k3) of steam distillation, so as to be treated together with the first condensates and the second condensates.

* * * * *